(12) United States Patent
Minami

(10) Patent No.: US 11,459,436 B2
(45) Date of Patent: Oct. 4, 2022

(54) POLY(3-HYDROXYALKANOATE) FOAM PARTICLES AND POLY(3-HYDROXYALKANOATE) FOAM MOLDED ARTICLE

(71) Applicant: KANEKA CORPORATION, Osaka (JP)

(72) Inventor: Tetsuya Minami, Settsu (JP)

(73) Assignee: KANEKA CORPORATION, Osaka (JP)

( * ) Notice: Subject to any disclaimer, the term of this patent is extended or adjusted under 35 U.S.C. 154(b) by 251 days.

(21) Appl. No.: 16/937,654

(22) Filed: Jul. 24, 2020

(65) Prior Publication Data

US 2020/0354539 A1 Nov. 12, 2020

Related U.S. Application Data

(63) Continuation-in-part of application No. PCT/JP2019/001713, filed on Jan. 21, 2019.

(30) Foreign Application Priority Data

Jan. 26, 2018 (JP) .............................. JP2018-011788

(51) Int. Cl.
  *C08J 9/20* (2006.01)
  *C08J 9/22* (2006.01)
  *C08J 9/06* (2006.01)
(52) U.S. Cl.
  CPC . *C08J 9/20* (2013.01); *C08J 9/06* (2013.01); *C08J 2367/00* (2013.01)

(58) Field of Classification Search
  CPC ... C08J 9/20; C08J 9/06; C08J 2367/00; C08J 2201/026; C08J 2201/03; C08J 2300/16;
  (Continued)

(56) References Cited

U.S. PATENT DOCUMENTS 6,110,983 A 8/2000 Tokoro et al.
2009/0149560 A1* 6/2009 Miyagawa .......... B29C 44/3461
521/59

(Continued)

FOREIGN PATENT DOCUMENTS

CN 101193956 A 6/2008
EP 1 867 677 A1 12/2007
(Continued)

OTHER PUBLICATIONS

International Search Report dated Mar. 19, 2019, in PCT/JP2019/001713, filed Jan. 21, 2019.

*Primary Examiner* — Kara B Boyle
(74) *Attorney, Agent, or Firm* — Oblon, McClelland, Maier & Neustadt, L.L.P.

(57) ABSTRACT

Provided are poly(3-hydroxyalkanoate) foam particles, which can give a foam molded article having good surface aspects and a low shrinkage ratio of a molding, and the foam molded article. The poly(3-hydroxyalkanoate) foam particles have at least two melting peaks on a DSC curve obtained by differential scanning calorimetry and in which a melting calorie (X) on a high temperature side is 0.1 to 20 J/g, a gel fraction (Y) is 20 to 75% by weight, and the melting calorie (X) and the gel fraction (Y) satisfy Formula: $X+Y \geq 30$.

13 Claims, 1 Drawing Sheet

(58) Field of Classification Search
CPC ..... C08J 9/18; C08J 9/232; C08J 9/122; C08J 2203/06; C08J 2367/04; C08J 9/16
See application file for complete search history.

(56) References Cited

U.S. PATENT DOCUMENTS

2009/0192236 A1   7/2009  Miyagawa et al.
2009/0197982 A1*  8/2009  Miyagawa .......... B29C 44/3461
                                                   521/60
2009/0286724 A1  11/2009  Konishi et al.

FOREIGN PATENT DOCUMENTS

| | | |
|---|---|---|
| JP | 10-324766 A | 12/1998 |
| JP | 2000-319438 A | 11/2000 |
| JP | 2012-241166 A | 12/2012 |
| WO | WO 2007/049694 A1 | 5/2007 |
| WO | WO 2007/049695 A1 | 5/2007 |

* cited by examiner

[FIG. 1]
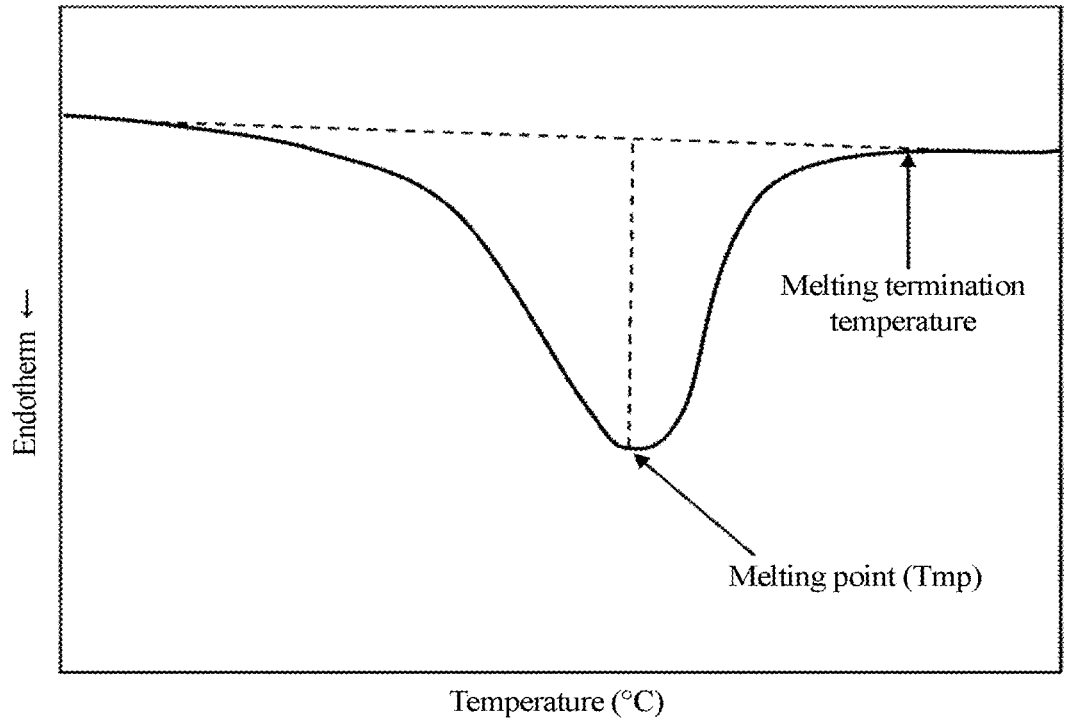
[FIG. 2]
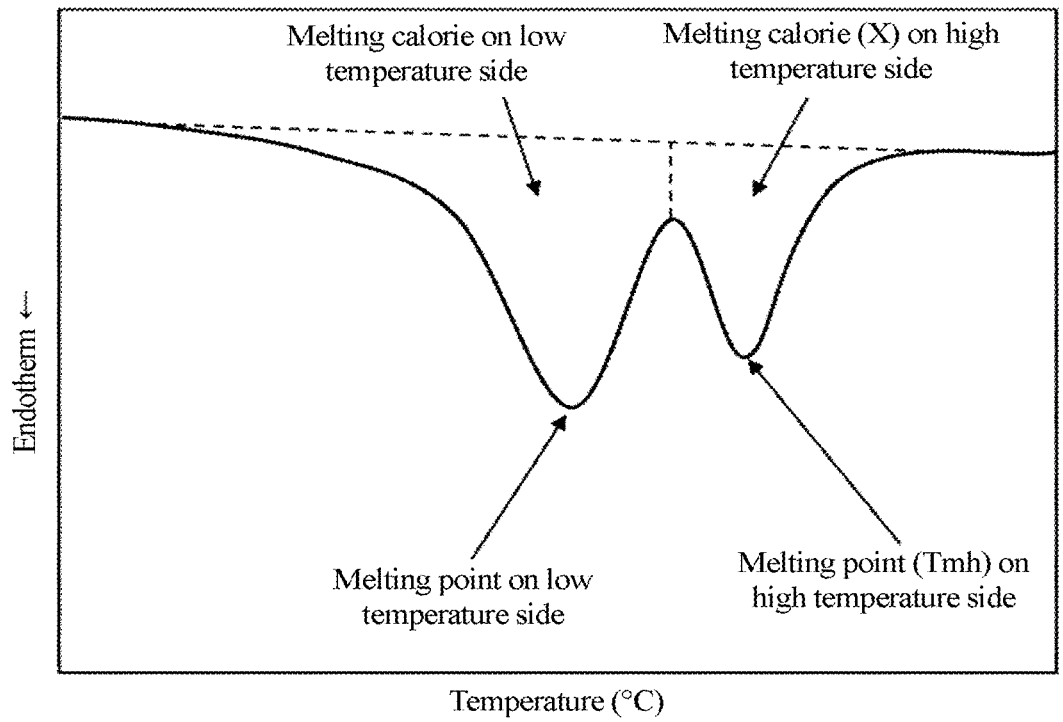

POLY(3-HYDROXYALKANOATE) FOAM PARTICLES AND POLY(3-HYDROXYALKANOATE) FOAM MOLDED ARTICLE

CROSS REFERENCE TO RELATED APPLICATIONS

This application is a Continuation-in-Part Application of International Application No. PCT/JP2019/001713, filed Jan. 21, 2019, and claims priority to Japanese Patent Application No. 2018-011788, filed Jan. 26, 2018, all of which are incorporated herein by reference in their entireties.

TECHNICAL FIELD

The present invention relates to poly(3-hydroxyalkanoate) foam particles obtained by foaming resin particles comprised of a poly(3-hydroxyalkanoate) composition, and poly(3-hydroxyalkanoate) foam molded article obtained by molding the foam particles.

BACKGROUND ART

Large amounts of petroleum-based plastics are disposed of every year, and serious problems caused by the large amounts of wastes, such as shortage of landfills and environment pollution, have been discussed. In recent years, microplastics have become a major problem in marine environments. Under the circumstances, biodegradable plastics have been drawing attention since biodegradable plastics are degraded by the action of microorganisms in environments such as sea or soil, landfills, or composts. Biodegradable plastics are under development with the aim of expanding their application to materials for use in the environment in agriculture, forestry, and fisheries, and also to food containers, packaging materials, sanitary materials, and garbage bags, which are difficult to recover/recycle after use. In addition, foams made of biodegradable plastics are expected to be used in cushioning materials for packaging, agricultural boxes, fish boxes, vehicle materials, construction materials, civil engineering materials, and the like.

Among the biodegradable plastics, from the viewpoint of excellent biodegradability and carbon neutral, poly(3-hydroxyalkanoate) (hereinafter sometimes referred to as P3HA) as a plant-derived plastic has been drawing attention. Among them, poly(3-hydroxybutyrate) (hereinafter sometimes referred to as P3HB), poly(3-hydroxybutyrate-co-3-hydroxyvalerate) (hereinafter sometimes referred to as P3HB3HV), poly(3-hydroxybutyrate-co-3-hydroxyhexanoate) (hereinafter sometimes referred to as P3HB3HH), poly (3-hydroxybutyrate-co-4-hydroxybutyrate) (hereinafter sometimes referred to as P3HB4HB), and the like have been drawing attention.

Development of the biodegradable plastics described above for foam applications has been researched. For example, Patent Literature 1 discloses pre-foamed particles using poly(3-hydroxybutyrate-co-3-hydroxyhexanoate), which is an aliphatic polyester resin having biodegradability, and a method of obtaining an in-mold foam molded article thereof. Patent Literature 2 discloses aliphatic polyester-based resin foam particles having biodegradability and having a crosslinked structure having a gel fraction of at least 5%, and a method of obtaining an aliphatic polyester-based resin foam particle molded article. In addition, Patent Literature 3 discloses polyhydroxyalkanoate resin foam particles comprised of a polyhydroxyalkanoate resin composition containing a polyhydroxyalkanoate and an isocyanate compound and having a melt viscosity greater than or equal to a specified melt viscosity.

CITATION LIST

Patent Literature

PTL 1: JP-A No. 2000-319438
PTL 2: JP-A No. H10-324766
PTL 3: WO 2007/049695

SUMMARY OF INVENTION

Technical Problem

Patent Literature 1 reports the aliphatic polyester-based pre-foamed particles having a crystal structure showing two melting points on a DSC curve according to a differential scanning calorimetry method and the method of obtaining an in-mold foam molded article from the pre-foamed particles. However, there is no description regarding a melting calorie of the aliphatic polyester-based pre-foamed particles. The present inventor has confirmed that in the method disclosed in Patent Literature 1, it is difficult to obtain aliphatic polyester-based pre-foamed particles having good moldability and physical properties and a molded article thereof (particularly, to obtain poly(3-hydroxyalkanoate) foam molded article having good surface aspects and a low shrinkage of a molding.

Patent Literature 2 reports that by setting the gel fraction of the aliphatic polyester-based resin foam particles to at least 5%, a shrinkage ratio of a molding of an aliphatic polyester-based resin foam particle molded article to be obtained is reduced. However, it is specifically shown that when polybutylene succinate is used as the aliphatic polyester-based resin, the shrinkage ratio of the molding is low by setting the gel fraction to at least 5%; however, there is no description about aliphatic polyester-based resins other than polybutylene succinate, and there is no disclosure of a specific embodiment using poly(3-hydroxyalkanoate), which is particularly difficult to be foam-molded. Furthermore, there is no description regarding a melting calorie of the aliphatic polyester-based resin foam particles. Therefore, the present inventor has confirmed that in the method disclosed in Patent Literature 2, it is difficult to obtain poly(3-hydroxyalkanoate) foam molded article having good surface aspects and a low shrinkage of a molding.

Patent Literature 3 reports that polyhydroxyalkanoate and an isocyanate compound are melt-kneaded with an extruder or the like to obtain a polyhydroxyalkanoate resin composition having a melt viscosity greater than or equal to a specified melt viscosity, so that polyhydroxyalkanoate resin foam particles in which a process window is wide during molding of a foam molded article and no post-shrinkage occurs after molding are obtained. However, since the melt viscosity is increased by melt-kneading with an extruder or the like, a load on the extruder or the like is very large, and productivity is low because a discharge amount needs to be reduced. If the melt viscosity is high, melt fracture is likely to occur, so that it is difficult to produce uniform polyhydroxyalkanoate resin particles having a small weight per piece. Thus, the present inventors confirmed that gaps were observed here and there between foam particles in an obtained foam molded article and that surface aspects were insufficient.

Accordingly, an object of the present invention is to provide poly(3-hydroxyalkanoate) foam particles, which can give a foam molded article having good surface aspects and a low shrinkage ratio of a molding, and the foam molded article.

Solution to Problem

The present inventor has conducted intensive researches to solve the above problem, and has found that according to poly(3-hydroxyalkanoate) foam particles which have at least two melting peaks on a DSC curve obtained by differential scanning calorimetry and in which a melting calorie on a high temperature side, a gel fraction, and the total amount are in specific ranges, a foam molded article having good surface aspects and a low shrinkage ratio of a molding can be obtained, and the present invention has been completed.

[1] Poly(3-hydroxyalkanoate) foam particles which have at least two melting peaks on a DSC curve obtained by differential scanning calorimetry and in which a melting calorie (X) on a high temperature side is 0.1 to 20 J/g, a gel fraction (Y) is 20 to 75% by weight, and the melting calorie (X) and the gel fraction (Y) satisfy the following formula (1):

$$X + Y \geq 30 \tag{1}$$

[2] The poly(3-hydroxyalkanoate) foam particles according to [1], in which poly(3-hydroxyalkanoate) is one or more selected from a group consisting of poly(3-hydroxybutyrate), poly(3-hydroxybutyrate-co-3-hydroxyvalerate), poly(3-hydroxybutyrate-co-3-hydroxyvalerate-co-3-hydroxyhexanoate), poly(3-hydroxybutyrate-co-3-hydroxyhexanoate) and poly(3-hydroxybutyrate-co-4-hydroxybutyrate).

[3] The poly(3-hydroxyalkanoate) foam particles according to [2], in which poly(3-hydroxyalkanoate) is a copolymer of 3-hydroxybutyrate and a comonomer, and a monomer ratio in the copolymer is 3-hydroxybutyrate/comonomer=99/1 to 80/20 (mol %/mol %).

[4] A poly(3-hydroxyalkanoate) foam molded article obtained by molding the foam particles according to any one of [1] to [3].

Advantageous Effects of Invention

The present invention can provide poly(3-hydroxyalkanoate) foam particles, which can give a foam molded article having good surface aspects and a low shrinkage ratio of a molding, and the foam molded article.

BRIEF DESCRIPTION OF DRAWINGS

FIG. 1 is a view showing a DSC curve of resin particles comprised of a P3HA composition, a melting point measured from the DSC curve, etc.

FIG. 2 is a view showing a DSC curve of P3HA foam particles, a melting calorie (X) on a high temperature side measured from the DSC curve, etc.

DESCRIPTION OF EMBODIMENTS

Hereinafter, each embodiment of the P3HA foam particles (poly(3-hydroxyalkanoate) foam particles) and the P3HA foam molded article (poly(3-hydroxyalkanoate) foam molded article) of the present invention will be described in detail. However, the present invention is not limited to these embodiments.

The P3HA foam particles of the present invention can be obtained, for example, by foaming resin particles comprised of a P3HA composition. The P3HA foam molded article is obtained by molding the P3HA foam particles, specifically, for example, by in-mold foam molding.

[P3HA]

P3HA in the present invention is a polymer having a 3-hydroxyalkanoate repeating unit as an essential structural unit (monomer unit), and is specifically preferably a polymer containing a repeating unit represented by the following general formula (1):

$$[-CHR-CH_2-CO-O-] \tag{1}$$

In the general formula (1), R represents an alkyl group represented by $C_pH_{2p+1}$, and p represents an integer of 1 to 15. Examples of R include linear or branched alkyl groups such as methyl group, ethyl group, propyl group, methylpropyl group, butyl group, isobutyl group, t-butyl group, pentyl group, and hexyl group. As p, 1 to 10 is preferable, and 1 to 8 is more preferable.

As P3HA, P3HA produced from a microorganism is particularly preferable. P3HA produced from a microorganism is poly[(R)-3-hydroxyalkanoate] in which the 3-hydroxyalkanoate repeating units are all (R)-3-hydroxyalkanoates.

P3HA preferably includes 50 mol % or more, more preferably 70 mol % or more, and even more preferably 80 mol % or more of the 3-hydroxyalkanoate repeating units (particularly the repeating unit of the general formula (1)), based on the total repeating units. Only the 3-hydroxyalkanoate repeating unit may be included as a repeating unit (monomer unit), or in addition to the 3-hydroxyalkanoate repeating unit, another repeating unit (e.g., 4-hydroxyalkanoate repeating unit) may be included.

P3HA preferably contains 80 mol % or more, and more preferably 85 mol % or more, of 3-hydroxybutyrate (hereinafter sometimes referred to as 3HB) as a repeating unit (monomer unit). In particular, P3HA (produced by a microorganism) in which 3-hydroxybutyrates are all (R)-3-hydroxybutyrates is preferable. Specific examples of P3HA include poly(3-hydroxybutyrate), poly(3-hydroxybutyrate-co-3-hydroxypropionate), poly(3-hydroxybutyrate-co-3-hydroxyvalerate) (P3HB3HV), poly(3-hydroxybutyrate-co-3-hydroxyvalerate-3-hydroxyhexanoate), poly(3-hydroxybutyrate-co-3-hydroxyhexanoate) (P3HB3HH), poly(3-hydroxybutyrate-co-3-hydroxyheptanoate), poly(3-hydroxybutyrate-co-3-hydroxyoctanoate), poly(3-hydroxybutyrate-co-3-hydroxynonanoate), poly(3-hydroxybutyrate-co-3-hydroxydecanoate), poly(3-hydroxybutyrate-co-3-hydroxyundecanoate), and poly(3-hydroxybutyrate-co-4-hydroxybutyrate) (P3HB3H4B). In particular, poly(3-hydroxybutyrate-co-3-hydroxyhexanoate) and poly(3-hydroxybutyrate-co-4-hydroxybutyrate) are preferable from the viewpoints of workability and physical properties of a foam molded article.

When P3HA is a polymer having 3-hydroxybutyrate as an essential structural unit, as a constituting ratio with a comonomer copolymerized with 3-hydroxybutyrate, for example, 3-hydroxyhexanoate (hereinafter sometimes referred to as 3HH) or 4-hydroxybutyrate (hereinafter sometimes referred to as 4HB), that is, as a monomer ratio in a copolymer, 3-hydroxybutyrate/comonomer is preferably 99/1 to 80/20 (mol %/mol %), more preferably 97/3 to 80/20 (mol %/mol %), and even more preferably 95/5 to 85/15 (mol %/mol %). When a comonomer ratio is less than 1 mol %, a melt processing temperature range of P3HA and a thermal decomposition temperature range are close to each other, and processability tends to be poor. On the other hand, when the comonomer ratio exceeds 20 mol %, there are tendencies that crystallization during melt processing is slow and productivity is low.

Each monomer ratio of P3HA can be determined by a method known to those skilled in the art, for example, a method described in International Publication No. 2013/147139.

A melting point of P3HA is not particularly limited, and is preferably 110 to 165° C., and more preferably 120 to 155° C. When the melting point is less than 110° C., a dimensional change of the obtained P3HA foam molded article upon heating tends to increase. On the other hand, when the melting point exceeds 165° C., hydrolysis tends to occur during a foaming process. In the measurement of the melting point of P3HA, using a differential scanning calorimeter (DSC6200, manufactured by Seiko Instruments Inc.), about 5 mg of P31A is weighed, and in a DSC curve obtained when temperature increases from 10° C. to 190° C. at a temperature increasing rate of 10° C./min, the melting point of P3HA is measured as a temperature of the highest-temperature melting peak.

A weight average molecular weight of P3HA is not particularly limited, and is preferably 200,000 to 2,000,000, more preferably 250,000 to 1,500,000, and even more preferably 300,000 to 1,000,000. When the weight average molecular weight is less than 200,000, the obtained P3HA foam particles tend to have a low closed cell ratio. On the other hand, when the weight average molecular weight exceeds 2,000,000, there are tendencies that a load on a machine during melt processing is high and productivity is low. The weight average molecular weight of P3HA can be measured from a molecular weight distribution in terms of polystyrene by using a gel permeation chromatography (HPLC GPC system manufactured by Shimadzu Corporation) using a chloroform solution. As a column in the gel permeation chromatography, a column suitable for measuring the weight average molecular weight may be used.

A method of producing P3HA in the present invention is not particularly limited, and may be a production method by chemical synthesis or a production method using a microorganism. Among these methods, the production method using a microorganism is preferable as described above. Known or commonly using methods can be applied to the production method using a microorganism.

For example, as microorganisms that produce a copolymer of 3-hydroxybutyrate and another hydroxyalkanoate, *Aeromonas caviae* that produces P3HB3HV and P3HB3HH, *Alcaligenes eutrophus* that produces P3HB4HB, and the like are known. Particularly, a preferred P3HB3HH-producing microorganism is, for example, *Alcaligenes eutrophus* AC32, FERM BP-6038 (T. Fukui, Y. Doi, J. Bateriol., 179, p. 4821-4830 (1997)) produced by introducing a P3HA synthase gene to improve P3HB3HH productivity. These microorganisms are cultured under appropriate conditions, and the thus obtained cells having P3HB3HH accumulated therein are used. Other than the above microorganisms, genetically-modified microorganisms may also be used which are produced by introducing various P3HA synthesis-related genes depending on the desired type of P3HA to be produced. In this case, culture conditions including the type of a substrate may be optimized.

In the present invention, the P3HA can be used alone or in a combination of two or more.

[Resin Particles Comprised of P3HA Composition]

The resin particles comprised of the P3HA composition in the present invention are particles comprised of a composition (P3HA composition) containing P3HA as an essential component. The composition usually contains P3HA and necessary additives. In the present application, the resin particles refer to particles that have not yet been foamed before being subjected to the foaming process.

A content of P3HA in the resin particles comprised of the P3HA composition is not particularly limited, and is preferably 70% by weight or more, and more preferably 80% by weight or more, from the viewpoint of biodegradability of foam particles and a foam molded article to be obtained.

A melting point (hereinafter sometimes referred to as Tmp) of the resin particles comprised of the P3HA composition is not particularly limited, and is preferably 110 to 165° C., and more preferably 120 to 155° C. When the melting point is less than 110° C., a dimensional change of the obtained P3HA foam molded article upon heating tends to increase. On the other hand, when the melting point exceeds 165° C., hydrolysis tends to occur during the foaming process. In the measurement of the melting point of the resin particles comprised of the P3HA composition, using a differential scanning calorimeter (DSC6200, manufactured by Seiko Instruments Inc.), about 5 mg of the resin particles comprised of the P3HA composition is weighed, and on the DSC curve obtained when temperature increases from 10° C. to 190° C. at a temperature increasing rate of 10° C./min, the melting point of the resin particles comprised of the P3HA composition is measured as a temperature of the highest-temperature melting peak.

A melt flow rate (hereinafter sometimes referred to as MFR) of the resin particles comprised of the P3HA composition is not particularly limited, and is preferably 1 to 20 g/10 min (minutes), more preferably 1 to 17 g/10 min, and even more preferably 1 to 15 g/10 min. When MFR is less than 1 g/10 min, it tends to be difficult to obtain foam particles having a low apparent density when only one foaming is performed. On the other hand, when MFR exceeds 20 g/10 min, the closed cell ratio of the obtained foam particles tends to decrease. Using a melt flow index tester (manufactured by Yasuda Seiki Company), MFR of the resin particles comprised of the P3HA composition is determined by measurement according to JIS K7210 under conditions in which a load is 5 kg and a measurement temperature is a melting termination temperature+5 to 10° C., which is read from a DSC curve obtained in "Measurement of melting point of resin particles comprised of P3HA composition".

A weight per resin particle comprised of the P3HA composition is not particularly limited, and is preferably 0.3 to 10 mg, and more preferably 0.5 to 5 mg. When the weight per piece is less than 0.3 mg, it tends to be difficult to stably produce resin particles comprised of the P3HA composition with high productivity. On the other hand, when the weight per piece exceeds 10 mg, it tends to be difficult to reduce thickness of the P3HA foam molded article.

A shape of the resin particles comprised of the P3HA composition is not particularly limited, and the length/diameter is preferably 0.5 to 3 and more preferably 0.7 to 2.5. If the length/diameter is less than 0.5, there are tendencies that a shape of the foam particles to be obtained is flat and surface aspects of the foam molded article to be obtained deteriorate. On the other hand, when the length/diameter exceeds 3, there are tendencies that mold-filling properties of a molding machine deteriorate and surface aspects of the P3HA foam molded article to be obtained deteriorate.

The resin particles comprised of the P3HA composition according to the present invention may contain an additive as long as the effects of the present invention are not impaired. As the additives, for example, a cell controlling agent, a crystallization nucleating agent, a lubricant, a plasticizer, an antistatic agent, a flame retardant, a conductive agent, a heat insulating agent, a crosslinking agent, an antioxidant, an ultraviolet absorber, a coloring agent, and an inorganic filler, an organic filler, a hydrolysis inhibitor, and the like can be used according to the purpose. In particular, additives having biodegradability are preferable.

Examples of the cell controlling agent include talc, silica, calcium silicate, calcium carbonate, aluminum oxide, titanium oxide, diatomaceous earth, clay, sodium bicarbonate, alumina, barium sulfate, aluminum oxide, and bentonite. Among them, talc is preferable because it is particularly excellent in dispersibility in P3HA. An amount of the cell controlling agent used is not particularly limited, and is preferably 0.01 to 1 part by weight, more preferably 0.03 to 0.5 parts by weight, and even more preferably 0.05 to 0.3 parts by weight, based on 100 parts by weight of P3HA. Not only one kind but also two or more kinds of the cell controlling agents may be mixed, and the mixing ratio can be appropriately adjusted according to the purpose.

Examples of the crystallization nucleating agent include pentaerythritol, orotic acid, aspartame, cyanuric acid, glycine, zinc phenylphosphonate, and boron nitride. Among them, pentaerythritol is preferable because a crystallization promoting effect of P3HA is particularly excellent. An amount of the crystallization nucleating agent used is not particularly limited, and is preferably 0.1 to 5 parts by weight, more preferably 0.5 to 3 parts by weight, and even more preferably 0.7 to 1.5 parts by weight, based on 100 parts by weight of P3HA. Not only one kind but also two or more kinds of the crystallization nucleating agents may be mixed, and the mixing ratio can be appropriately adjusted according to the purpose.

Examples of the lubricant include behenic amide, oleic amide, erucic amide, stearic amide, palmitic amide, N-stearyl behenic amide, N-stearyl erucic amide, ethylenebis stearic amide, ethylenebis oleic amide, ethylenebis erucic amide, ethylenebis lauric amide, ethylenebis capric amide, p-phenylenebis stearic amide, and a polycondensate of ethylene diamine, stearic acid, and sebacic acid. Among them, behenic amide and erucic amide are preferable because a lubricant effect on P3HA is particularly excellent. An amount of the lubricant used is not particularly limited, and is preferably 0.01 to 5 parts by weight, more preferably 0.05 to 3 parts by weight, and even more preferably 0.1 to 1.5 parts by weight, based on 100 parts by weight of P3HA. Not only one kind but also two or more kinds of the lubricants may be mixed, and the mixing ratio can be appropriately adjusted according to the purpose.

Examples of the plasticizer include glycerin ester-based compounds, citrate ester-based compounds, sebacate ester-based compounds, adipate ester-based compounds, polyether ester-based compounds, benzoate ester-based compounds, phthalate ester-based compounds, isosorbide ester-based compounds, polycaprolactone-based compounds, and dibasic acid ester-based compounds. Among them, glycerin ester-based compounds, citrate ester-based compounds, sebacate ester-based compounds, and dibasic acid ester-based compounds are preferable because a plasticizing effect on P3HA is particularly excellent. Examples of the glycerin ester-based compounds include glycerin diacetomonolaurate. Examples of the citrate ester-based compounds include acetyl tributyl citrate. Examples of the sebacate ester-based compounds include dibutyl sebacate. Examples of the dibasic acid ester-based compounds include benzyl methyl diethylene glycol adipate. An amount of the plasticizer used is not particularly limited, and is preferably 1 to 20 parts by weight, more preferably 2 to 15 parts by weight, and even more preferably 3 to 10 parts by weight, based on 100 parts by weight of P3HA. Not only one kind but also two or more kinds of the plasticizers may be mixed, and the mixing ratio can be appropriately adjusted according to the purpose.

When the resin particles comprised of the P3HA composition according to the present invention are produced, a compound having an isocyanate group (hereinafter referred to as the isocyanate compound) may be used. However, the isocyanate compound may have toxicity. The P3HA foam particles and foam molded article to be obtained may become yellow. Accordingly, an amount of the isocyanate compound used is preferably less than 3 parts by weight, more preferably less than 1 part by weight, and even more preferably less than 0.1 parts by weight, based on 100 parts by weight of P3HA. Most preferably, the resin particles contain no isocyanate compound.

As the isocyanate compound, for example, a polyisocyanate compound having two or more isocyanate groups per molecule can be used. Specific types include aromatic, alicyclic, and aliphatic isocyanates. Examples of the aromatic isocyanates include an isocyanate compound having a structure of tolylene, diphenylmethane, naphthylene, tolidine, xylene, or triphenylmethane, examples of the alicyclic isocyanates include an isocyanate compound having a structure of isophorone or hydrogenated diphenylmethane, and examples of the aliphatic isocyanates include an isocyanate compound having a structure of hexamethylene or lysine. In addition, a combination of two or more of these isocyanate compounds may be used, but from the viewpoint of versatility, handleability, weather resistance and others, a polyisocyanate of tolylene or diphenylmethane is preferably used, and the polyisocyanate of diphenylmethane is particularly preferably used.

The resin particles comprised of the P3HA composition according to the present invention (the same applies to the P3HA foam particles) may further contain a resin component other than P3HA (sometimes referred to as "other resin components"). Examples of other resin components include aliphatic polyesters such as polylactic acid, polybutylene succinate, polybutylene succinate adipate, polybutylene adipate terephthalate, polybutylene succinate terephthalate, and polycaprolactone and aliphatic aromatic polyesters. Other resin components can be used alone or in a combination of two or more. A content of other resin components in the resin particles comprised of the P3HA composition according to the present invention (the same applies to the P3HA foam particles) is not particularly limited, and is, for example, preferably 10 to 400 parts by weight, and more preferably 50 to 150 parts by weight, based on 100 parts by weight of P3HA.

A method of producing the resin particles comprised of the P3HA composition according to the present invention is not particularly limited, and the resin particles can be produced by applying a known or common method. For example, first, P3HA and, if necessary, the additive are melt-kneaded using an extruder, a kneader, a banbury mixer, a roll, or the like, and the melted P3HA composition is discharged from a nozzle of a die and then cut to obtain the resin particles comprised of the P3HA composition having a shape that can be easily used for foaming in the present invention, such as a column, an elliptic column, a sphere, a cube, or a cuboid. As a production apparatus, a twin-screw extruder is preferable from the viewpoint of productivity and convenience.

In the method of producing the resin particles comprised of the P3HA composition, the temperature at which P3HA and, if necessary, the additive are melt-kneaded cannot be uniformly defined because it is different depending on the melting point, weight average molecular weight, etc. of P3HA and the additive used; however, for example, a temperature of the melted P3HA composition discharged from the nozzle of the die is preferably 150 to 200° C., more preferably 160 to 195° C., and even more preferably 170 to 190° C. When the temperature of the melted P3HA composition is lower than 150° C., the P3HA composition tends to be insufficiently melt-kneaded. On the other hand, when the temperature of the melted P3HA composition exceeds 200° C., P3HA tends to be thermally decomposed.

In the method of producing the resin particles comprised of the P3HA composition, a temperature at which the melted P3HA composition discharged from the nozzle of the die is cooled is not particularly limited, and is preferably 20 to 80° C., more preferably 30 to 70° C., and even more preferably 40 to 60° C. When the cooling temperature is lower than 20° C., there are tendencies that the rate of crystallization of the melted P3HA composition is slow and productivity of the resin particles comprised of the P3HA composition is low. On the other hand, when the cooling temperature exceeds 80° C., there are tendencies that the rate of crystallization of the melted P3HA composition is slow and the productivity of the resin particles comprised of the P3HA composition is low.

[P3HA Foam Particles]

The P3HA foam particles of the present invention can be obtained, for example, by foaming the resin particles comprised of the P3HA composition described above. It is important that the P3HA foam particles of the present invention satisfy all of the following properties [1], [2] and [3].

The P3HA foam particles of the present invention [1] which have at least two melting peaks on a DSC curve obtained by differential scanning calorimetry and in which a melting calorie (X) on a high temperature side is 0.1 to 20 J/g,

[2] a gel fraction (Y) is 20 to 75% by weight, and

[3] Formula (1): X (J/g)+Y (% by weight)≥30 is satisfied have at least two melting peaks on the DSC curve obtained by differential scanning calorimetry described later (for example, see FIG. 2). When the number of the melting peaks is two, the melting calorie determined from the melting peak on the high temperature side is referred to as the "melting calorie (X) on the high temperature side" described above. When the number of the melting peaks is three or more, the melting calorie determined from the highest temperature melting peak is referred to as the "melting calorie (X) on the high temperature side" described above.

The melting calorie (X) on the high temperature side of the DSC curve obtained by the differential scanning calorimetry of the P3HA foam particles of the present invention is 0.1 to 20 J/g as described above, preferably 0.3 to 18 J/g, and more preferably 0.5 to 15 J/g. When the melting calorie (X) on the high temperature side is less than 0.1 J/g, the foam particles to be obtained stick to each other, resulting in poor molding and failing to obtain a good foam molded article. On the other hand, when the melting calorie (X) on the high temperature side exceeds 20 J/g, elongation of the foam particles during molding deteriorates, and surface aspects of the foam molded article become poor.

The method of measuring the melting calorie (X) on the high temperature side of the P3HA foam particles is as follows. Using a differential scanning calorimeter (DSC6200, manufactured by Seiko Instruments Inc.), about 5 mg of the P3HA foam particles is weighed, and on the DSC curve obtained when temperature increases from 10° C. to 190° C. at a temperature increasing rate of 10° C./min, a baseline before the start of melting and a baseline after the end of melting are connected by a straight line (broken line substantially along an X-axis direction in FIG. 2). Next, a straight line (broken line along a Y-axis direction in FIG. 2) is drawn vertically from a maximum point between the melting peak on the high temperature side or the highest temperature melting peak and the adjacent melting peak. A calorie calculated from a high-temperature side region surrounded by the baseline, the vertical straight line, and the DSC curve is the melting calorie (X) on the high temperature side (for example, see FIG. 2).

A temperature (melting point) (referred to as "Tmh") of the melting peak on the high temperature side or the highest temperature melting peak in the above-described DSC measurement of the P3HA foam particles of the present invention is preferably higher than the melting point (Tmp) of the resin particles before foaming. Tmh is preferably (Tmp+3°) C or higher, more preferably (Tmp+5°) C or higher, and even more preferably (Tmp+7°) C or higher. On the other hand, Tmh is preferably (Tmp+15°) C or lower, and more preferably (Tmp+13°) C or lower. For example, when P3HA constituting the P3HA foam particles is P3HB3HH having a melting point of 145° C. which is a polymer having 3-hydroxybutyrate as an essential structural unit, Tmh is preferably 150 to 160° C., and more preferably 152 to 158° C. Means for controlling Tmh to the range as described in this paragraph is not particularly limited, and mainly includes adjustment of foaming temperature, foaming pressure, holding time before foaming, and the like. Details will be described later.

The melting calorie (X) on the high temperature side of the DSC curve of the P3HA foam particles of the present invention, which is obtained by differential scanning calorimetry, is a value which will be an index for an amount of crystals having a high melting point, and this is deeply associated with viscoelasticity during foaming of the resin particles comprised of the P3HA composition and expansion of the P3HA foam particles. That is, the melting calorie (X) of 0.1 to 20 J/g indicates that the P3HA foam particles contain a specific amount of crystals having a high melting point, whereby when the resin particles comprised of the P3HA composition are foamed and the P3HA foam particles are expanded, a high closed cell ratio is maintained while exhibiting excellent foamability and expandability, and a foam molded article having good surface aspects and a low shrinkage ratio of a molding can be obtained.

Means for controlling the melting calorie (X) on the high temperature side in the P3HA foam particles of the present invention to 0.1 to 20 J/g includes conditions during foaming (particularly, foaming temperature, foaming pressure) and time for holding the resin particles in a pressure-resistant vessel before foaming. For example, increasing the foaming temperature tends to decrease the melting calorie (X), and conversely, decreasing the foaming temperature tends to increase the melting calorie (X). This is because an amount of crystals that are not melted changes depending on the foaming temperature. Increasing the foaming pressure tends to decrease the melting calorie (X), and conversely, decreasing the foaming pressure tends to increase the melting calorie (X). This is because a degree of plasticization changes depending on the foaming pressure, and the amount of crystals that are not melted changes. The foaming pressure can be controlled by an amount of a blowing agent.

The melting calorie (X) tends to increase as the time for holding the resin particles in the pressure-resistant vessel before foaming increases. This is because the growing amount of crystals that are not melted changes depending on the holding time. A temperature at which the resin particles are held in the pressure-resistant vessel before foaming is usually about the same as the foaming temperature. By adjusting these parameters mainly, the melting calorie (X) can be controlled to 0.1 to 20 J/g.

Increasing MFR of the resin particles tends to increase the melting calorie (X), and conversely, decreasing MFR tends to decrease the melting calorie (X). This is because a growing amount of crystals that are not melted changes depending on MFR. MFR of the resin particles can be controlled by a molecular weight of P3HA.

In addition, increasing the gel fraction of the P3HA foam particles tends to decrease the melting calorie (X), and conversely, decreasing the gel fraction tends to increase the melting calorie (X). This is because the growing amount of crystals that are not melted changes depending on the gel fraction.

The gel fraction (Y) of the P3HA foam particles of the present invention is an index indicating a degree of cross-linking of P3HA in the foam particles. The gel fraction (Y) is, as described above, 20 to 75% by weight, preferably 25 to 70% by weight, and more preferably 30 to 68% by weight. When the gel fraction (Y) is less than 20% by weight, the closed cell ratio of the foam particles to be obtained tends to be low, and the surface aspects of the foam molded article become poor. On the other hand, when the gel fraction (Y) exceeds 75% by weight, it becomes difficult to obtain foam particles having a low apparent density when only one foaming is performed. The gel fraction of the P3HA foam particles can be controlled, in particular, by the type, amount used, etc. of a crosslinking agent.

The method of measuring the gel fraction of the P3HA foam particles is as follows. In a 150 ml flask, 1 g of the foam particles and 100 ml of chloroform are put, and heated and refluxed at 62° C. for 8 hours under atmospheric pressure. Then, the obtained heat-treated product is filtered using a suction filtration apparatus having a wire gauze with 100 meshes. The obtained filtered product on the wire gauze is dried in an oven at 80° C. under vacuum for 8 hours. At this time, a weight Wg (g) of the resultant dried product is measured. The gel fraction is calculated as Wg/1×100 (% by weight).

As described above, in the P3HA foam particles of the present invention, the melting calorie (X; J/g) on the high temperature side and the gel fraction (Y; wt %) satisfy the following formula (1):

$$X+Y \geq 30 \tag{1}$$

The melting calorie (X) on the high temperature side and the gel fraction (Y) of the P3HA foam particles of the present invention preferably satisfy $75 \geq X+Y \geq 30$, and more preferably satisfy $70 \geq X+Y \geq 35$. When X+Y is less than 30, the closed cell ratio of the foam particles to be obtained is low, resulting in poor surface aspects of the foam molded article and/or an increase in the shrinkage ratio of the molding. The present inventor has clarified that even when the melting calorie (X) on the high temperature side and the gel fraction (Y) of the P3HA foam particles are set to specific ranges, there is a case where a problem that the surface aspects of the foam molded article become poor and the shrinkage ratio of the molding becomes too high may occur, and has found that such a problem can be solved by setting a sum (X+Y) of X and Y to 30 or more.

The apparent density of the P3HA foam particles of the present invention is not particularly limited, and is preferably 0.02 to 0.6 g/cm$^3$, and more preferably 0.03 to 0.3 g/cm$^3$. When P3HA foam particles having a desired apparent density cannot be obtained when only one foaming is performed, the foam particles that have been foamed once may be subjected to a second or subsequent foaming process. In the apparent density of the P3HA foam particles, a graduated cylinder containing ethanol is prepared, a group of foam particles having a weight Wd (g) is immersed in the graduated cylinder using a wire gauze or the like, and a volume of the foam particle group read from an amount of a rise in liquid level of ethanol is defined as Vd (cm$^3$). The apparent density of the foam particles is Wd/Vd (g/cm$^3$).

The closed cell ratio of the P3HA foam particles of the present invention is not particularly limited, and is preferably 88% or more, and more preferably 93% or more. When the closed cell ratio is less than 88%, the foam molded article to be obtained tends to have a high shrinkage ratio of a molding. The method of measuring the closed cell ratio of the P3HA foam particles is as follows. For the P3HA foam particles, in accordance with the method described in PROSEDURE C of ASTM D2856-87, a volume Vc (cm$^3$) is measured using an air-comparison pycnometer (Model 1000, manufactured by Tokyo Science). Next, a total amount of the foam particles after measurement of Vc is immersed in a graduated cylinder containing ethanol, and an apparent volume Va (cm$^3$) of the foam particles is determined from an amount of a rise in liquid level in the graduated cylinder (submersion method). The closed cell ratio of the foam particles is 100−(Va−Vc)×100/Va (%).

An average cell diameter of the P3HA foam particles of the present invention is not particularly limited, and is preferably 50 to 500 μm, and more preferably 100 to 400 μm. The method of measuring the average cell diameter of the P3HA foam particles is as follows. The foam particles are cut at the center thereof using a razor (high stainless double edge blade manufactured by Feather Safety Razor Co., Ltd.). In an image obtained by observing the cut surface at a magnification of 50 times using an optical microscope (VHX-100 manufactured by Keyence Corporation), a straight line passing through the almost center of the foam particles is drawn, and the number n of cells through which the straight line is passed, and a foam particle diameter L (μm) decided by an intersection point of the straight line and the foam particle surface are read. The average cell diameter of the foam particles is L/n (μm).

The method of producing the P3HA foam particles of the present invention is not particularly limited, and for example, the method described below can be applied. For example, a blowing agent is introduced into a pressure-resistant vessel comprising a dispersion comprising the resin particles comprised of the P3HA composition, water, a dispersant, a crosslinking agent and, if necessary, a dispersant aid, a crosslinking aid and a plasticizer. More specifically, the resin particles comprised of the P3HA composition, water, a dispersant, a crosslinking agent and, if necessary, a dispersant aid, a crosslinking aid and a plasticizer are charged, under stirring, into a pressure-resistant vessel, and these are sufficiently dispersed. Thereafter, a blowing agent is introduced into the pressure-resistant vessel. Alternatively, the resin particles comprised of the P3HA composition, water, a dispersant, a crosslinking agent and, if necessary, a dispersant aid, a crosslinking aid and a plasticizer are sufficiently dispersed in another vessel, and the resulting dispersion and a blowing agent are introduced sequentially into a pressure-resistant vessel. Thereafter, in order to impregnate the resin particles with a blowing agent and to impregnate and react with a crosslinking agent, the resin particles are held at a constant temperature for a certain period of time, if necessary. In addition, while the resin particles are impregnated with a blowing agent and impregnated and reacted with a crosslinking agent, the content of the pressure-resistant vessel is heated to a temperature equal to or higher than a softening temperature of the resin particles, and thereafter, if necessary, the content of the pressure-resistant vessel are held at around a foaming temperature for a certain period of time. Thereafter, an end of the pressure-resistant vessel is released, and the content such as the resin particles and water are released into an atmosphere at a lower pressure than a pressure in the pressure-resistant vessel to foam the resin particles, whereby the P3HA foam particles are obtained (hereinafter this series of operations are sometimes referred to as depressurization foaming). The temperature in the pressure-resistant vessel at the time of release into a low-pressure atmosphere is defined as a foaming temperature, and the pressure in the pressure-resistant vessel at the time of release into a low-pressure atmosphere is defined as a foaming pressure.

The water is not particularly limited as long as the resin particles comprised of the P3HA composition, a dispersant, a dispersant aid, a crosslinking agent, a blowing agent, and the like can be uniformly dispersed in the water. For example, RO water (water purified by reverse osmosis membrane technique), or pure water or ultrapure water such as distilled water or deionized water (water purified by ion exchange resin), can be used. An amount of water used is not particularly limited, and is preferably 100 to 1,000 parts by weight based on 100 parts by weight of the resin particles comprised of the P3HA resin composition.

Examples of the dispersant include inorganic substances such as tricalcium phosphate, trimagnesium phosphate, basic magnesium carbonate, calcium carbonate, barium sulfate, kaolin, talc, clay, aluminum oxide, titanium oxide, and aluminum hydroxide. An amount of the dispersant used is not particularly limited, and is preferably 0.1 to 3.0 parts by weight based on 100 parts by weight of the resin particles comprised of the P3HA resin composition.

Examples of the dispersant aid include anionic surfactants such as sodium dodecylbenzenesulfonate, sodium α-olefin sulfonate, and normal paraffin sodium sulfonate. An amount of the dispersant aid used is not particularly limited, and is preferably 0.001 to 0.5 parts by weight, and more preferably 0.01 to 0.2 parts by weight, based on 100 parts by weight of the resin particles comprised of the P3HA resin composition. It is preferable that the dispersant and the dispersant aid be used in combination.

Examples of the crosslinking agent include organic peroxides. The organic peroxide is a preferable crosslinking agent for the process because the organic peroxide does not need to be mixed and reacted with P3HA by melt-kneading, and, as described above, after the resin particles are produced, the resin particles can be impregnated and reacted with the organic peroxide. An organic peroxide having a one minute half-life temperature of 120 to 160° C. is preferable depending on the type of P3HA to be used and the like. In particular, diacyl peroxides are preferable. Specific examples include Di-benzoyl peroxide (one minute half-life temperature: 130° C.). When the one minute half-life temperature of the organic peroxide is less than 120° C., the resin particles comprised of the P3HA composition tend not to be uniformly crosslinked, depending on the melting point of P3HA and the like. On the other hand, when one minute half-life temperature of the organic peroxide exceeds 160° C., an unreacted crosslinking agent tends to remain, depending on conditions of depressurization foaming and the like. When the organic peroxide is used as a crosslinking agent, a crosslinked structure is formed by bonding molecular chains of P3HA directly (without being via a structure derived from the crosslinking agent).

An amount of the crosslinking agent used is not particularly limited, and is preferably 0.1 to 5 parts by weight, more preferably 0.3 to 3 parts by weight, and even more preferably 0.5 to 2 parts by weight, based on 100 parts by weight of the resin particles comprised of the P3HA resin composition. When the amount of the crosslinking agent used is less than 0.1 parts by weight, it is difficult to satisfy the requirement of the gel fraction (Y). In addition, the closed cell ratio of the foam particles to be obtained tends to be low, and it becomes difficult to obtain a foam molded article having good surface aspects and a low shrinkage ratio of a molding. On the other hand, when the amount of the crosslinking agent used exceeds 5 parts by weight, sufficient effects are not achieved in proportion to the addition, and economic waste tends to occur. By using the crosslinking agent, P3HA in the P3HA foam particles becomes P3HA having a crosslinked structure, and can satisfy the requirement of the gel fraction (Y). Since the amount of the crosslinking agent used is correlated with the gel fraction (Y) and greatly affects the value of the gel fraction (Y), it is desirable to set strictly the amount of the crosslinking agent used in consideration of the gel fraction (Y) to be obtained.

Examples of the crosslinking aid include compounds having at least one unsaturated bond in the molecule. Among them, allyl esters, acrylic esters, methacrylic esters, divinyl compounds and the like are particularly preferable. An amount of the crosslinking aid used is not particularly limited, and is preferably 0.01 to 3 parts by weight, more preferably 0.03 to 1.5 parts by weight, and even more preferably 0.05 to 1 part by weight, based on 100 parts by weight of the resin particles comprised of the P3HA resin composition. When the amount of the crosslinking aid used is less than 0.01 parts by weight, the effect as the crosslinking aid tends to be small.

Examples of the plasticizer include glycerin ester-based compounds, citrate ester-based compounds, sebacate ester-based compounds, adipate ester-based compounds, polyether ester-based compounds, benzoate ester-based compounds, phthalate ester-based compounds, isosorbide ester-based compounds, polycaprolactone-based compounds, and dibasic acid ester-based compounds. Among them, glycerin ester-based compounds, citrate ester-based compounds, sebacate ester-based compounds, and dibasic acid ester-based compounds are preferable because a plasticizing effect on P3HA is excellent. Examples of the glycerin ester-based compounds include glycerin diacetomonolaurate. Examples of the citrate ester-based compounds include acetyl tributyl citrate. Examples of the sebacate ester-based compounds include dibutyl sebacate. Examples of the dibasic acid ester-based compounds include benzyl methyl diethylene glycol adipate. An amount of the plasticizer used is not particularly limited, and is preferably 1 to 20 parts by weight, more preferably 2 to 15 parts by weight, and even more preferably 3 to 10 parts by weight, based on 100 parts by weight of the resin particles comprised of the P3HA resin composition. Not only one kind but also two or more kinds of the plasticizers may be mixed, and the mixing ratio can be appropriately adjusted according to the purpose.

As the blowing agent, it is possible to use at least one selected from the group consisting of inorganic gases such as carbon dioxide, nitrogen, and air; saturated hydrocarbons having 3 to 5 carbon atoms such as propane, normal butane, isobutane, normal pentane, isopentane, and neopentane; ethers such as dimethyl ether, diethyl ether, and methyl ethyl ether; halogenated hydrocarbons such as monochloromethane, dichloromethane, and dichlorodifluoroethane; water; and the like. Among them, carbon dioxide is preferably used from the viewpoint of environmental load and foaming power. An amount of the blowing agent added is not particularly limited, and is preferably 2 to 10,000 parts by weight, more preferably 5 to 5,000 parts by weight, and even more preferably 10 to 1,000 parts by weight, based on 100 parts by weight of the resin particles comprised of the P3HA composition. If the amount of the blowing agent added is less than 2 parts by weight, it tends to be difficult to obtain foam particles having a low apparent density. On the other hand, when the amount of the blowing agent added exceeds 10,000 parts by weight, sufficient effects are not achieved in proportion to the addition, and economic waste tends to occur.

In the depressurization foaming, when the resin particles comprised of the P3HA composition are impregnated and reacted with a crosslinking agent and, if necessary, crosslinking aid, in order to increase crosslinking efficiency, the oxygen concentration in the pressure-resistant vessel and a dissolved oxygen amount of water are preferably reduced. Examples of the method include substitution with an inorganic gas, such as carbon dioxide and nitrogen, and vacuuming.

In the depressurization foaming, a rate (hereinafter sometimes referred to as the temperature increasing rate) at which the temperature increases to a desired foaming temperature is preferably 1 to 3° C./min, and more preferably 1.5 to 3° C./min. When the temperature increasing rate is less than 1° C./min, productivity tends to be low. On the other hand, when the temperature increasing rate exceeds 3° C./min, during temperature increasing, impregnation of the resin particles, comprised of the P3HA composition, with the blowing agent and impregnation and reaction of the resin particles with the crosslinking agent tend to be insufficient.

In the depressurization foaming, the foaming temperature cannot be uniformly defined because it is different depending on the type of P3HA, the type of the blowing agent, the desired apparent density of the foam particles, and the like. However, the foaming temperature is preferably set to a temperature lower than the temperature (Tmh) of the melting peak on the high temperature side or the highest temperature melting peak in the above-described DSC measurement of the foam particles and preferably set to a temperature lower than the melting point (Tmp) of the resin particles before foaming. The foaming temperature is, specifically, for example, preferably 100 to 140° C. If the foaming temperature is too low (for example, lower than 100° C.), it tends to be difficult to obtain foam particles having a low apparent density. On the other hand, if the foaming temperature is too high (for example, higher than 140° C.), hydrolysis of the resin particles comprised of the P3HA composition tends to occur in a pressure-resistant vessel. Since the foaming temperature is correlated with the melting calorie (X) on the high temperature side and greatly affects the value of the melting calorie (X) on the high temperature side, it is desirable to set strictly the foaming temperature in consideration of the melting calorie (X) on the high temperature side, which will be obtained.

In the depressurization foaming, the foaming pressure is preferably 1 to 10 MPa (gauge pressure), and more preferably 2 to 5 MPa (gauge pressure). If the foaming pressure is less than 1 MPa (gauge pressure), it tends to be difficult to obtain foam particles having a low apparent density.

In the depressurization foaming, a temperature at which the resin particles comprised of the P3HA composition are impregnated with the blowing agent and impregnated and reacted with the crosslinking agent cannot be uniformly defined because it is different depending on the type of P3HA, the type of the crosslinking agent, and the like. However, the temperature is preferably 70 to 110° C. A holding time at the temperature is preferably 1 to 60 minutes, and more preferably 3 to 45 minutes.

In the depressurization foaming, the time for holding at around the foaming temperature is not particularly limited, and is preferably 1 to 60 minutes, and more preferably 5 to 45 minutes. When the holding time is less than 1 minute, an unreacted crosslinking agent tends to remain. On the other hand, when the time exceeds 60 minutes, hydrolysis of the resin particles comprised of the P3HA composition tends to occur. The longer the holding time, the higher the melting calorie (X) on the high temperature side tends to be.

In the depressurization foaming, when the contents in the pressure-resistant vessel, such as the resin particles comprised of the P3HA composition and water, are released into the low-pressure atmosphere, the contents can be released through an opening orifice having a diameter of 1 to 5 mm for the purpose of flow rate adjustment, reduction of expansion variation, etc. With respect to resin particles comprised of a P3HA composition having a relatively high melting point, the low-pressure atmosphere may be filled with saturated steam for the purpose of improving foamability.

In the present invention, P3HA foam particles having a desired apparent density may not be obtained only by the depressurization foaming. In that case, the P3HA foam particles obtained by the depressurization foaming are placed in a pressure-resistant vessel and pressurized so that the P3HA foam particles are impregnated with an inorganic gas such as air or carbon dioxide, and thus a pressure (hereinafter sometimes referred to as the foam particle internal pressure) in the P3HA foam particles is increased over atmospheric pressure. Thereafter, the P3HA foam particles are heated with superheated steam or the like to be further expanded, and P3HA secondary expansion foam particles having a desired apparent density may be obtained (hereinafter this series of operations are sometimes referred to as secondary expansion).

The foam particle internal pressure during the secondary expansion is preferably 0.15 to 0.60 MPa (absolute pressure), and more preferably 0.30 to 0.60 MPa (absolute pressure).

In the secondary expansion, the temperature in the pressure-resistant vessel at which the P3HA foam particles are impregnated with the inorganic gas is preferably 20 to 90° C., and more preferably 40 to 90° C.

In the secondary expansion, the pressure (hereinafter sometimes referred to as secondary expansion pressure) of superheated steam or the like for heating the P3HA foam particles cannot be uniformly defined because it is different depending on properties of the foam particles to be used and a desired apparent density. However, the pressure is preferably 0.01 to 0.171 MPa (gauge pressure), and more preferably 0.03 to 0.11 Pa (gauge pressure).

The P3HA secondary expansion foam particles preferably satisfy the apparent density, closed cell ratio, and average cell diameter of the P3HA foam particles described above.

[P3HA Foam Molded Article]

A method of producing the P3HA foam molded article of the present invention is not particularly limited, and the P3HA foam molded article can be produced by applying a known or common method. Examples of the production methods include the following in-mold foam molding methods (A) to (D), but there is no particular limitation.

(A) A method of pressurizing the P3HA foam particles (including the above-described P3HA secondary expansion foam particles, the same applies hereinafter) with an inorganic gas, impregnating the foam particles with the inorganic gas, applying a predetermined foam particle internal pressure, then filling the foam particles in a mold, and heating the foam particles with superheated steam.

(B) A method of filling a mold with the P3HA foam particles, then compressing the mold so that the volume in the mold is reduced by 10 to 75%, and heating the P3HA foam particles with superheated steam.

(C) A method of compressing the P3HA foam particles with a gas pressure, filling the P3HA foam particles in a mold, and heating the P3HA foam particles with superheated steam using a recovery force of the foam particles.

(D) A method of filling the P3HA foam particles in a mold and heating the P3HA foam particles with superheated steam without particular pretreatment.

In the production of the P3HA foam molded article of the present invention, the pressure (hereinafter sometimes referred to as molding pressure) of superheated steam for heating the P3HA foam particles cannot be uniformly defined because it is different depending on the properties of the foam particles to be used and the like. However, the pressure is preferably 0.05 to 0.30 MPa (gauge pressure), and more preferably 0.08 to 0.25 MPa (gauge pressure).

Among the methods of producing a P3HA foam molded article of the present invention, as the inorganic gas in the method (A), it is possible to use at least one selected from the group consisting of air, nitrogen, oxygen, carbon dioxide, helium, neon, argon, or the like. Among them, air or carbon dioxide is preferable.

Among the methods of producing a P3HA foam molded article of the present invention, the foam particle internal pressure in the method (A) is preferably 0.10 to 0.30 MPa (absolute pressure), and more preferably 0.15 to 0.30 MPa (absolute pressure).

Among the methods of producing a P3HA foam molded article of the present invention, in the method (A), the temperature in the pressure-resistant vessel at which the foam particles are impregnated with the inorganic gas is preferably 20 to 90° C., and more preferably 40 to 80° C.

The P3HA foam molded article of the present invention can be used for various applications, and, for example, can be used for cushioning materials for packaging, agricultural boxes, fish boxes, vehicle materials, construction material, civil engineering materials, and the like.

EXAMPLES

Hereinafter, the present invention is specifically described with reference to Examples, but the technical scope of the present invention is not limited by these Examples.

Materials used in Examples and Comparative Examples are indicated below.

[Poly(3-hydroxyalkanoate)]

P3HA-1: P3HB3HH (Kaneka biodegradable polymer PHBH X131N manufactured by Kaneka Corporation, monomer ratio being 3HB/3HH=95/5 (mol %/mol %))

P3HA-2: P3HB3HH (Kaneka biodegradable polymer PHBH X331N manufactured by Kaneka Corporation, monomer ratio being 3HB/3HH=95/5 (mol %/mol %))

P3HA-3: P3HB3HH (Kaneka biodegradable polymer PHBH 151N manufactured by Kaneka Corporation, monomer ratio being 3HB/3HH=89/11 (mol %/mol %))

P3HA-4: P3HB4HB (EM5400 manufactured by Shenzhen Ecomann Biotechnology Co., Ltd., monomer ratio being 3HB/41B=86/14 (mol %/mol %))

[Cell controlling agent] Cell controlling agent: talc (Talcan Powder PKS manufactured by Hayashi Kasei Co., Ltd.)

[Plasticizer] Plasticizer-1: glycerin diacetmonolaurate (RIKEMAL PL-012 manufactured by Riken Vitamin Co., Ltd.)

Plasticizer-2: benzyl methyl diethylene glycol adipate (DAIFATTY-101 manufactured by Daihachi Chemical Industry Co., Ltd.)

[Dispersant] Dispersant: tricalcium phosphate (manufactured by Taihei Chemical Industrial Co., Ltd.)

[Dispersant aid] Dispersant aid: sodium alkyl sulfonate (Latemul PS manufactured by Kao Corporation)

[Crosslinking agent] Crosslinking agent: benzoyl peroxide (content about 75%) (Perkadox L-W75 LS manufactured by Kayaku Akzo Corporation)

Evaluation methods performed in Examples and Comparative Examples are explained.

[Measurement of Melting Point of Resin Particles Comprised of P3HA Composition]

Using a differential scanning calorimeter (DSC6200, manufactured by Seiko Instruments Inc.), about 5 mg of the resin particles comprised of the P3HA composition was weighed, and in a DSC curve obtained when temperature increased from 10° C. to 190° C. at a temperature increasing rate of 10° C./min, the temperature of the highest-temperature melting peak was taken as the melting point (exemplified in FIG. 1).

[Measurement of MFR of Resin Particles Comprised of P3HA Composition]

Using a melt flow index tester (manufactured by Yasuda Seiki Company), the MFR of the resin particles comprised of the P3HA composition was measured according to JIS K7210 under conditions in which the load was 5 kg and the measurement temperature was the melting termination temperature+5 to 10° C., which was read from the DSC curve obtained in "Measurement of melting point of resin particles comprised of P3HA composition".

[Measurement of Melting Calorie and Melting Point of P3HA Foam Particles]

Using a differential scanning calorimeter (DSC6200, manufactured by Seiko Instruments Inc.), about 5 mg of the P3HA foam particles is weighed, and on the DSC curve obtained when the temperature increases from 10° C. to 190° C. at a temperature increasing rate of 10° C./min, the baseline before the start of melting and the baseline after the end of melting are connected by a straight line. Next, a straight line is drawn vertically from a maximum point between the highest-temperature melting peak and the adjacent melting peak. The calorie calculated from the high-temperature side region surrounded by the baseline, the vertical straight line, and the DSC curve was taken as the melting calorie (X) on the high temperature side, and a calorie calculated from a low-temperature side region was determined as a melting calorie on a low temperature side. On the DSC curve, the temperature of the highest-temperature melting peak was taken as the melting point on the high temperature side, and a temperature which was lower than the temperature of the highest-temperature melting peak and at which the melting peak was highest was taken as a melting point on the low temperature side (exemplified in FIG. 2).

[Measurement of Gel Fraction of P3HA Foam Particles]

In a 150 ml flask, 1 g of the P3HA foam particles and 100 ml of chloroform were put, and heated and refluxed at 62° C. for 8 hours under atmospheric pressure. Then, the obtained heat-treated product was filtered using a suction filtration apparatus having a wire gauze with 100 meshes. The obtained filtered product on the wire gauze was dried in an oven at 80° C. under vacuum for 8 hours. At this time, the weight Wg (g) of the resultant dried product was measured. The gel fraction was determined from Wg/1×100 (% by weight).

[Measurement of Apparent Density of P3HA Foam Particles or P3HA Secondary Expansion Foam Particles]

A graduated cylinder containing ethanol was prepared, the P3HA foam particles or the P3HA secondary expansion foam particles (the weight Wd (g) of the group of the foam particles) were immersed in the graduated cylinder using a wire gauze or the like, and the volume of the foam particle group read from the amount of a rise in liquid level of ethanol was defined as Vd ($cm^3$). The apparent density of the foam particles was determined from Wd/Vd ($g/cm^3$).

[Measurement of Closed Cell Ratio of P3HA Foam Particles or P3HA Secondary Expansion Foam Particles]

For the P3HA foam particles or the P3HA secondary expansion foam particles, in accordance with the method described in PROSEDURE C of ASTM D2856-87, the volume Vc ($cm^3$) was measured using an air-comparison pycnometer [Model 1000, manufactured by Tokyo Science]. Next, the total amount of the foam particles after measurement of Vc was immersed in a graduated cylinder containing ethanol, and the apparent volume Va ($cm^3$) of the foam particles was determined from the amount of a rise in liquid level in the graduated cylinder (submersion method). The closed cell ratio of the foam particles was determined from 100−(Va−Vc)×100/Va (%).

[Measurement of Average Cell Diameter of P3HA Foam Particles or P3HA Secondary Expansion Foam Particles]

The P3HA foam particles or the P3HA secondary expansion foam particles were cut at the center thereof using a razor (high stainless double edge blade manufactured by Feather Safety Razor Co., Ltd.). In an image obtained by observing the cut surface at a magnification of 50 times using an optical microscope (VHX-100 manufactured by Keyence Corporation), a straight line passing through the almost center of the foam particles was drawn, and the number n of cells through which the straight line was passed, and the foam particle diameter L (m) decided by the intersection point of the straight line and the foam particle surface were read. The average cell diameter of the foam particles was determined from L/n (μm).

[Evaluation of Surface Aspects of P3HA Foam Molded Article]

The P3HA foam molded article was visually observed, the surface and edge of the foam molded article were observed, and evaluation was performed based on the following criteria. The edge of the foam molded article is a ridgeline portion where the surfaces of the foam molded article cross each other.

Good: The foam particles are stretched during in-mold foam molding, and adjacent foam particles are completely fusion bonded in any part with almost no gap therebetween.

Poor: The foam particles are not stretched during in-mold foam molding, and there are many gaps between adjacent foam particles.

[Evaluation of Shrinkage Ratio of Molding of P3HA Foam Molded Article]

A longitudinal size (a direction of 400 mm) of the P3HA foam molded article was measured using a digital caliper. $L_0$ was a size of a corresponding mold, and $L_1$ was a size of the foam molded article. A dimensional shrinkage ratio to mold was calculated by $(L_0-L_1) \div L_0 \times 100(\%)$, and the shrinkage ratio of the molding was evaluated by the following criteria.

Good: The dimensional shrinkage ratio to mold is 5% or less, and the shrinkage ratio of the molding is low.

Poor: The dimensional shrinkage ratio to mold is more than 5%, and the shrinkage ratio of the molding is high.

[Measurement of Density of P3HA Foam Molded Article]

The length, width, and thickness of the P3HA foam molded article were measured using a digital caliper to determine the volume of the foam molded article. A value obtained by dividing the weight of the foam molded article by the volume of the foam molded article was defined as the density of the foam molded article.

[Measurement of Compressive Stress of P3HA Foam Molded Article]

Using a tensile and compression testing machine (TG-50 kN manufactured by Minebea Co., Ltd.), the compressive stress at 10%, 25%, and 50% strain was determined in accordance with JIS K 6767.

[Measurement of Cushioning Properties of P3HA Foam Molded Article]

Using a cushioning material evaluation testing machine (ACST-200 manufactured by Shinyei Testing Machinery Co., Ltd.), a cushioning coefficient and maximum stress at a first dropping were determined in accordance with JIS Z 0235.

[Measurement of Dimensional Stability of P3HA Foam Molded Article at High Temperature]

Using a hot-air-circulating type drier (LC-114 manufactured by Espec Corporation), a heating dimensional change rate upon heating at 100° C. for 22 hours was determined in accordance with the JIS K 6767 B method.

[Measurement of Thermal Conductivity of P31A Foam Molded Article]

Using a thermal conductivity measuring device (HC-074 manufactured by Eko Instruments Co., Ltd.), the thermal conductivity at 23° C. was determined in accordance with JIS A 1412.

[Evaluation of Biodegradability of P3HA Foam Molded Article]

From seawater collected from a harbor portion of Takasago-shi, Hyogo, Japan, foreign substances were removed with a mesh of opening size 80 μm, and the seawater was placed in a plastic container. In accordance with ASTM D-7081, 0.5 g of ammonium chloride and 0.1 g of dipotassium phosphate were added to 1 L of seawater. The P3HA foam molded article cut into a 50 mm square was immersed in seawater together with a weight so as to prevent the P3HA foam molded article from floating, and the water temperature was maintained at 23° C. The weight was measured before the start of the test and after three months, and a weight loss rate was determined. The seawater was replaced every month.

Example 1

[Production of Resin Particles Comprised of P3HA Composition]

Using P3HA-1 as P3HA, weighing was performed such that the amount of P3HA-1 was 100 parts by weight, and the amount of a cell controlling agent was 0.1 parts by weight, and the materials were dry-blended. The dry-blended mixture was melt-kneaded at a cylinder set temperature of 130 to 160° C. using a twin-screw extruder (TEM-26SX manufactured by Toshiba Machine Co., Ltd.), and the melted P3HA composition at 179° C. discharged from a nozzle of a die attached to a tip of the extruder was water-cooled at 50° C. and then cut to obtain resin particles whose weight per piece was 4.5 mg. The obtained resin particles had a melting point of 145° C., and MFR measured at 160° C. was 2.4 g/10 min.

[Production of P3HA Foam Particles]

100 parts by weight of the obtained resin particles comprised of the P3HA composition, 200 parts by weight of pure water, 1 part by weight of a dispersant, 0.05 parts by weight of a dispersant aid, and 0.67 parts by weight of a crosslinking agent were charged, under stirring, into a pressure-resistant vessel, and then nitrogen was introduced into the pressure-resistant vessel to remove oxygen. Next, carbon dioxide was introduced as a blowing agent into the pressure-resistant vessel. Thereafter, the temperature of the contents of the pressure-resistant vessel was increased to a foaming temperature of 129.0° C. Thereafter, carbon dioxide was additionally introduced to raise the pressure to a foaming pressure of 3.3 MPa (gauge pressure), and the contents were held at around the foaming temperature and the foaming pressure for 30 minutes. Thereafter, a valve at a lower portion of the pressure-resistant vessel was opened, and the contents of the pressure-resistant vessel were released under atmospheric pressure through an opening orifice having a diameter of 3.6 mm to obtain foam particles. After the dispersant attached to the surface of the foam particles was washed, the foam particles were dried at 75° C. The melting calorie (X) on the high temperature side of the obtained foam particles was 11.7 J/g, the gel fraction (Y) was 21% by weight, and X+Y=32.7. Table 1 summarizes other properties of the foam particles.

TABLE 1

| | | | Example 1 | Example 2 | Example 3 | Example 4 | Example 5 | Example 6 |
|---|---|---|---|---|---|---|---|---|
| Formulation | P3HA-1 | Part(s) by weight | 100 | 100 | 100 | 100 | 100 | 100 |
| | Cell controlling agent | Part(s) by weight | 0.1 | 0.1 | 0.1 | 0.1 | 0.1 | 0.1 |
| | Crosslinking agent | Part(s) by weight | 0.67 | 0.8 | 1 | 1.33 | 2 | 2 |
| Foaming condition | Foaming temperature | ° C. | 129.0 | 129.5 | 129.0 | 128.0 | 128.5 | 124.5 |
| | Foaming pressure | MPa (gauge pressure) | 3.3 | 3.3 | 3.3 | 3.3 | 3.3 | 3.5 |
| Property of foam particles | Melting point on low temperature side | ° C. | 142 | 143 | 142 | 142 | 142 | 142 |
| | Melting point on high temperature side | ° C. | 155 | 156 | 156 | 155 | 156 | 151 |
| | Melting calorie on low temperature side | J/g | 51.6 | 57.6 | 55.9 | 53.2 | 57.2 | 45.7 |
| | Melting calorie (X) on high temperature side | J/g | 11.7 | 5.5 | 3.9 | 7.8 | 1.3 | 12.4 |
| | Gel fraction (Y) | wt % | 21 | 30 | 49 | 55 | 67 | 69 |
| | X + Y | — | 32.7 | 35.5 | 52.9 | 62.8 | 68.3 | 81.4 |
| | Apparent density | g/cm³ | 0.085 | 0.064 | 0.059 | 0.079 | 0.081 | 0.178 |
| | Closed cell ratio | % | 98 | 97 | 98 | 99 | 98 | 99 |
| | Average cell diameter | μm | 270 | 281 | 313 | 261 | 265 | 152 |
| Molding condition | Foam particle internal pressure | MPa (absolute pressure) | 0.23 | 0.22 | 0.21 | 0.23 | 0.23 | 0.25 |
| | Molding pressure | MPa (gauge pressure) | 0.17 | 0.16 | 0.17 | 0.20 | 0.15 | 0.23 |
| Foam molded article | Surface aspects | — | Good | Good | Good | Good | Good | Good |
| | Shrinkage ratio of molding | — | Good | Good | Good | Good | Good | Good |
| | Density of molded article | g/cm³ | 0.057 | 0.044 | 0.040 | 0.053 | 0.054 | 0.119 |

| | | | Example 7 | Comparative Example 1 | Comparative Example 2 | Comparative Example 3 | Comparative Example 4 |
|---|---|---|---|---|---|---|---|
| Formulation | P3HA-1 | Part(s) by weight | 100 | 100 | 100 | 100 | 100 |
| | Cell controlling agent | Part(s) by weight | 0.1 | 0.1 | 0.1 | 0.1 | 0.1 |
| | Crosslinking agent | Part(s) by weight | 1.33 | 0 | 0 | 0.74 | 2 |
| Foaming condition | Foaming temperature | ° C. | 128.0 | 124.0 | 129.0 | 129.5 | 130.0 |
| | Foaming pressure | MPa (gauge pressure) | 3.3 | 4.0 | 3.3 | 3.3 | 3.3 |
| Property of foam particles | Melting point on low temperature side | ° C. | 142 | 142 | 142 | 143 | 143 |
| | Melting point on high temperature side | ° C. | 155 | 151 | 156 | 156 | — |
| | Melting calorie on low temperature side | J/g | 53.2 | 39.8 | 45.2 | 56.2 | 60.5 |
| | Melting calorie (X) on high temperature side | J/g | 7.8 | 21.5 | 16.2 | 6.3 | 0 |
| | Gel fraction (Y) | wt % | 55 | 0 | 0 | 22 | 59 |
| | X + Y | — | 62.8 | 21.5 | 16.2 | 28.3 | 59 |
| | Apparent density | g/cm³ | 0.079 | 0.231 | 0.059 | 0.060 | 0.080 |
| | Closed cell ratio | % | 99 | 98 | 98 | 94 | 97 |
| | Average cell diameter | μm | 261 | 149 | 263 | 322 | 273 |

TABLE 1-continued

| Molding condition | Foam particle internal pressure | MPa (absolute pressure) | — | 0.25 | 0.21 | 0.22 | — |
|---|---|---|---|---|---|---|---|
| | Molding pressure | MPa (gauge pressure) | 0.20 | 0.21 | 0.20 | 0.19 | — |
| Foam molded article | Surface aspects | — | Good | Poor | Poor | Good | — |
| | Shrinkage ratio of molding | — | Good | Good | Poor | Poor | — |
| | Density of molded article | g/cm³ | 0.066 | 0.156 | — | — | — |

[Production of P3HA foam Molded Article]

The obtained foam particles were charged into a pressure-resistant vessel heated to 75° C. and pressurized with air to adjust the foam particle internal pressure to 0.23 MPa (absolute pressure). The foam particles were filled in a mold having a length of 400 mm, a width of 300 mm, and a thickness of 60 mm of a molding machine (KD-345 manufactured by DAISEN CO., LTD.). Next, the foam particles were heated with a superheated steam pressure of 0.17 MPa (gauge pressure) to obtain a foam molded article, and the obtained foam molded article was then dried at 75° C. Table 1 summarizes the results of the foam molded article. The surface aspects of the obtained foam molded article were good, and the shrinkage ratio of the molding was low. The compressive stress of the obtained foam molded article was 0.26 MPa at 10% strain, 0.32 MPa at 25% strain, and 0.38 MPa at 50% strain. The cushioning coefficient was 2.40, and the maximum stress was 0.88 MPa. The heating dimensional change rate was −0.1%. The thermal conductivity was 0.035 W/(m·K). The weight loss rate was 37% by weight. Thus, it could be confirmed that the P3HA foam molded article was biodegraded while having properties close to those of a conventional polyolefin foam molded article.

Examples 2 to 6, Comparative Examples 1 to 4

Foam particles and a foam molded article were produced in the same manner as in Example 1, except that the formulation, the foaming conditions, and the like were changed as shown in Table 1, and the same evaluation as in Example 1 was performed. The results are summarized in Table 1.

As shown in Table 1, according to the foam particles (Examples 1 to 6) in which the melting calorie (X) on the high temperature side was 0.1 to 20 J/g, the gel fraction (Y) was 20 to 75% by weight, and X+Y≥30 was satisfied, a foam molded article having good surface aspects and a low shrinkage ratio of a molding was obtained.

On the other hand, in the case of the foam particles (Comparative Examples 1 and 2) having a gel fraction (Y) of 0% by weight, the foam particles were not stretched during in-mold foam molding, and the surface aspects of the obtained foam molded article were poor. In the case of the foam particles (Comparative Example 3) in which X+Y was less than 30, the shrinkage ratio of the molding of the obtained foam molded article was high. In the case of the foam particles (Comparative Example 4) which had only one melting peak on the DSC curve and in which the melting calorie (X) on the high temperature side was 0 J/g, since the foam particles stuck to each other and could not be sufficiently filled in a mold of a molding machine, a foam molded article that could be evaluated in various ways could not be obtained.

Example 7

[Production of P3HA Foam Molded Article]

After the foam particles obtained in Example 4 were filled in a mold having a length of 400 mm, a width of 300 mm, and a thickness of 85 mm of a molding machine (KD-345 manufactured by DAISEN CO., LTD.) without being pressurized with air, the foam particles were compressed by 25 mm in a thickness direction and then heated with a superheated steam pressure of 0.20 MPa (gauge pressure) to obtain a foam molded article, and then the obtained foam molded article was dried at 75° C. Table 1 summarizes the results of the same evaluations as in Example 1. The surface aspects of the obtained foam molded article were good, and the shrinkage ratio of the molding was low.

Example 8

As shown in Table 2, foam particles and a foam molded article were produced in the same manner as in Example 1, except that the formulation was changed, and the weight per resin particle was changed to 0.9 mg, etc. Table 2 summarizes the results of the same evaluations as in Example 1.

TABLE 2

| | | | Example 8 | Example 9 | Example 10 | Example 11 | Example 12 | Example 13 | Example 14 |
|---|---|---|---|---|---|---|---|---|---|
| Formulation | P3HA-1 | Part(s) by weight | 100 | — | — | — | 80 | 100 | 100 |
| | P3HA-2 | Part(s) by weight | — | 100 | — | — | — | — | — |
| | P3HA-3 | Part(s) by weight | — | — | 100 | — | 20 | — | — |
| | P3HA-4 | Part(s) by weight | — | — | — | 100 | — | — | — |
| | Cell controlling agent | Part(s) by weight | 0.1 | 0.1 | 0.1 | 0.1 | 0.1 | 0.1 | 0.1 |
| | Crosslinking agent | Part(s) by weight | 1.33 | 2 | 1.33 | 1.33 | 1.33 | 1.33 | 1.33 |
| | Plasticizer-1 | Part(s) by weight | — | — | — | — | — | 5 | — |
| | Plasticizer-2 | Part(s) by weight | — | — | — | — | — | — | 5 |
| Resin particles | Weight | mg/piece | 0.9 | 4.5 | 4.5 | 4.5 | 4.5 | 4.5 | 4.5 |
| | Melting point of resin particle | ° C. | 145 | 145 | 130 | 131 | 142 | 144 | 144 |
| | MFR measurement temperature | ° C. | 160 | 160 | 165 | 165 | 165 | 160 | 160 |
| | MFR | g/10 min | 2.3 | 15 | 3.3 | 5.1 | 3.1 | 3.4 | 3.5 |

TABLE 2-continued

|  |  |  | Example 8 | Example 9 | Example 10 | Example 11 | Example 12 | Example 13 | Example 14 |
|---|---|---|---|---|---|---|---|---|---|
| Foaming condition | Foaming temperature | °C. | 128.0 | 128.0 | 113.0 | 114.5 | 125.0 | 125.5 | 125.5 |
|  | Foaming pressure | MPa (gauge pressure) | 3.3 | 3.3 | 3.3 | 3.3 | 3.3 | 4.0 | 4.0 |
| Property of foam particles | Melting point on low temperature side | °C. | 142 | 142 | 118 | 120 | 140 | 139 | 139 |
|  | Melting point on high temperature side | °C. | 155 | 155 | 139 | 140 | 153 | 152 | 152 |
|  | Melting calorie on low temperature side | J/g | 52.9 | 56.2 | 44.8 | 43.9 | 51.1 | 50.2 | 50.7 |
|  | Melting calorie (X) on high temperature side | J/g | 7.9 | 3.7 | 4.1 | 5.2 | 6.3 | 6.1 | 5.8 |
|  | Gel fraction (Y) | wt % | 53 | 63 | 58 | 55 | 56 | 61 | 60 |
|  | X + Y | — | 60.9 | 66.7 | 62.1 | 60.2 | 62.3 | 67.1 | 65.8 |
|  | Apparent density | g/cm³ | 0.089 | 0.078 | 0.077 | 0.076 | 0.079 | 0.050 | 0.049 |
|  | Closed cell ratio | % | 99 | 98 | 98 | 97 | 98 | 98 | 98 |
|  | Average cell diameter | μm | 243 | 286 | 275 | 288 | 268 | 279 | 284 |
| Molding condition | Foam particle internal pressure | MPa (absolute pressure) | 0.23 | 0.23 | 0.23 | 0.23 | 0.23 | 0.20 | 0.20 |
|  | Molding pressure | MPa (gauge pressure) | 0.20 | 0.17 | 0.13 | 0.13 | 0.15 | 0.17 | 0.17 |
| Foam molded article | Surface aspects | — | Good | Good | Good | Good | Good | Good | Good |
|  | Shrinkage ratio of molding | — | Good | Good | Good | Good | Good | Good | Good |
|  | Density of molded article | g/cm³ | 0.060 | 0.053 | 0.052 | 0.051 | 0.053 | 0.034 | 0.033 |

As shown in Table 2, in the foam particles obtained in Example 8, the melting calorie (X) on the high temperature side was 7.9 J/g, the gel fraction (Y) was 53% by weight, and X+Y=60.9. In the foam molded article obtained by molding the foam particles, the surface aspects were good, and the shrinkage ratio of the molding was low.

Examples 9 to 12

Resin particles, foam particles and a foam molded article were produced in the same manner as in Example 1, except that the formulation, the foaming conditions, and the like were changed as shown in Table 2. Table 2 summarizes the results of the same evaluations as in Example 1. In the obtained foam molded article, the surface aspects were good, and the shrinkage ratio of the molding was low.

Examples 13 and 14

[Production of Resin Particles Comprised of P3HA Composition]

Using P3HA-1 as P3HA, weighing was performed such that the amount of P3HA-1 was 100 parts by weight, and the amount of a cell controlling agent was 0.1 parts by weight, and the materials were dry-blended. The dry-blended mixture was melt-kneaded at a cylinder set temperature of 130 to 160° C. using a twin-screw extruder (TEM-26SX manufactured by Toshiba Machine Co., Ltd.), and the melted P3HA composition at 175° C. discharged from a nozzle of a die attached to a tip of the extruder was water-cooled at 45° C. and then cut to obtain resin particles whose weight per piece was 4.5 mg. At this time, a liquid addition pump (manufactured by Nikkiso Co., Ltd.) was connected to an extruder, and 5 parts by weight of a plasticizer was added. Table 2 summarizes the formulation and the properties of the obtained resin particles.

Foam particles and a foam molded article were produced in the same manner as in Example 1, except that the formulation was changed as shown in Table 2. Table 2 summarizes the results of the same evaluations as in Example 1. In the obtained foam molded article, the surface aspects were good, and the shrinkage ratio of the molding was low.

Example 15

[Production of P3HA Secondary Expansion Foam Particles and Foam Molded Article]

The foam particles obtained in Example 4 were charged into a pressure-resistant vessel heated to 75° C. and pressurized with air to adjust the foam particle internal pressure to 0.45 MPa (absolute pressure). Thereafter, the foam particles were heated with a superheated steam of 0.08 MPa (gauge pressure) to obtain secondary expansion foam particles, and the obtained secondary expansion foam particles were then dried at 60° C. The apparent density of the obtained secondary expansion foam particles was 0.031 g/cm³.

Using the secondary expansion foam particles, a foam molded article was produced in the same manner as in Example 1. Table 3 summarizes the results of the same evaluations as in Example 1. In the obtained foam molded article, the surface aspects were good, and the shrinkage ratio of the molding was low.

TABLE 3

|  |  |  | Example 15 |
|---|---|---|---|
| Secondary expansion foaming condition | Foam particle internal pressure | MPa (absolute gauge) | 0.45 |
|  | Secondary expansion foaming pressure | MPa (gauge pressure) | 0.08 |

TABLE 3-continued

|  |  |  | Example 15 |
|---|---|---|---|
| Property of secondary expansion foam particles | Apparent density | g/cm³ | 0.031 |
|  | Closed cell ratio | % | 98 |
|  | Average cell diameter | μm | 317 |
| Molding condition | Foam particle internal pressure | MPa (absolute gauge) | 0.21 |
|  | Molding pressure | MPa (gauge pressure) | 0.19 |
| Foam molded article | Surface aspects | — | Good |
|  | Shrinkage ratio of molding | — | Good |
|  | Density of molded article | g/cm³ | 0.021 |

As described above, according to the P3HA foam particles of the present invention, it has been confirmed that a P3HA foam molded article having good surface aspects and a low shrinkage ratio of a molding can be obtained.

The invention claimed is:

1. Poly(3-hydroxyalkanoate) foam particles having at least two melting peaks on a DSC curve obtained by differential scanning calorimetry, a melting calorie (X) on a high temperature side being 0.1 to 20 J/g, a gel fraction (Y) being 20 to 75% by weight, and the melting calorie (X) and the gel fraction (Y) satisfying the following formula (1):

$$X+Y \geq 30 \tag{1},$$

wherein the poly(3-hydroxyalkanoate) foam particles are obtained by a process comprising foaming resin particles comprising a poly(3-hydroxyalkanoate) composition, where the resin particles contain no isocyanate compound or contain the isocyanate compound in an amount of less than 3 parts by weight based on 100 parts by weight of poly(3-hydroxyalkanoate).

2. The poly(3-hydroxyalkanoate) foam particles according to claim 1, wherein poly(3-hydroxyalkanoate) is at least one selected from the group consisting of poly(3-hydroxybutyrate), poly(3-hydroxybutyrate-co-3-hydroxyvalerate), poly(3-hydroxybutyrate-co-3-hydroxyvalerate-co-3-hydroxyhexanoate), poly(3-hydroxybutyrate-co-3-hydroxyhexanoate) and poly(3-hydroxybutyrate-co-4-hydroxybutyrate).

3. The poly(3-hydroxyalkanoate) foam particles according to claim 2, wherein poly(3-hydroxyalkanoate) is a copolymer of 3-hydroxybutyrate and a comonomer, and a monomer ratio in the copolymer is 3-hydroxybutyrate/comonomer=99/1 to 80/20 (mol %/mol %).

4. The poly(3-hydroxyalkanoate) foam particles according to claim 1, wherein the amount of the isocyanate compound is less than 0.1 parts by weight based on 100 parts by weight of poly(3-hydroxyalkanoate).

5. The poly(3-hydroxyalkanoate) foam particles according to claim 1, wherein the poly(3-hydroxyalkanoate) foam particles comprise a crosslinked structure formed by bonding molecular chains of poly(3-hydroxyalkanoate) directly without a structure derived from a crosslinking agent.

6. The poly(3-hydroxyalkanoate) foam particles according to claim 1, wherein the poly(3-hydroxyalkanoate) foam particles have an apparent density of 0.02 to 0.6 g/cm³.

7. The poly(3-hydroxyalkanoate) foam particles according to claim 1, wherein the poly(3-hydroxyalkanoate) foam particles have an average cell diameter of 50 to 500 μm.

8. A process for producing the poly(3-hydroxyalkanoate) foam particles according to claim 1, comprising:
introducing a blowing agent into a pressure-resistant vessel comprising a dispersion comprising the resin particles comprising the poly(3-hydroxyalkanoate) composition, water, a dispersant, and a crosslinking agent;
heating a content of the pressure-resistant vessel to a temperature equal to or higher than a softening temperature of the resin particles;
holding the content of the pressure-resistant vessel at around a foaming temperature for a certain period of time; and
releasing an end of the pressure-resistant vessel, and releasing the content into an atmosphere at a lower pressure than a pressure in the pressure-resistant vessel to foam the resin particles.

9. The process according to claim 8, wherein the crosslinking agent is an organic peroxide.

10. The process according to claim 9, wherein the organic peroxide is an diacyl peroxide.

11. The process according to claim 8, wherein a foaming pressure is 2 to 5 MPa.

12. A poly(3-hydroxyalkanoate) foam molded article obtained by molding the foam particles according to claim 1.

13. A process for producing a poly(3-hydroxyalkanoate) foam molded article, comprising:
producing the poly(3-hydroxyalkanoate) foam particles in accordance with the process of claim 8;
filling the poly(3-hydroxyalkanoate) foam particles in a mold; and
heating the poly(3-hydroxyalkanoate) foam particles with superheated steam.

* * * * *